United States Patent [19]

Lively et al.

[11] 4,284,385
[45] Aug. 18, 1981

[54] METHOD AND EQUIPMENT FOR HANDLING PIPE MOUNTED CARRIAGE

[75] Inventors: Steven A. Lively, Dewey; Stephen K. Madden, Bartlesville, both of Okla.

[73] Assignee: H. C. Price Co., Bartlesville, Okla.

[21] Appl. No.: 66,516

[22] Filed: Aug. 15, 1979

[51] Int. Cl.³ .............................................. B23Q 5/22
[52] U.S. Cl. .................................... 414/747; 405/154
[58] Field of Search .................. 414/747; 29/781; 405/154, 170; 254/135 R, 29; 294/88, 74

[56] References Cited

U.S. PATENT DOCUMENTS

| | | | |
|---|---|---|---|
| 3,204,417 | 9/1965 | Robley | 405/170 |
| 3,207,326 | 9/1965 | Enix | 414/747 |
| 3,588,164 | 6/1971 | Wheeler | 414/747 |
| 4,028,903 | 6/1977 | Dietrich | 414/747 |
| 4,130,204 | 12/1978 | Pickard | 414/747 |

*Primary Examiner*—Robert J. Spar
*Assistant Examiner*—Kenneth Noland

*Attorney, Agent, or Firm*—Lowe, Kokjer, Kircher, Wharton & Bowman

[57] ABSTRACT

Apparatus for supporting a carriage such as for an automatic welding machine for welding line pipe on a lay barge where the machine is successively lifted from and set upon the pipe. A power cylinder operates extendable legs in accordance with its full stroke and cables connected with an overhead support are also connected to the movable legs and trained over a sheave on the carriage to provide certain lost motion between the extended positions of the legs and their retracted positions so that all of the carriage weight is borne by the legs when extended and all of the weight is borne by the cables when the legs are retracted, thus insuring that the legs clear the pipe irrespective of variations in the distance between the pipe and the overhead support. The sheave is positioned on the carriage to effectively increase the distance by which the carriage is moved by the power cylinder throughout its stroke.

6 Claims, 6 Drawing Figures

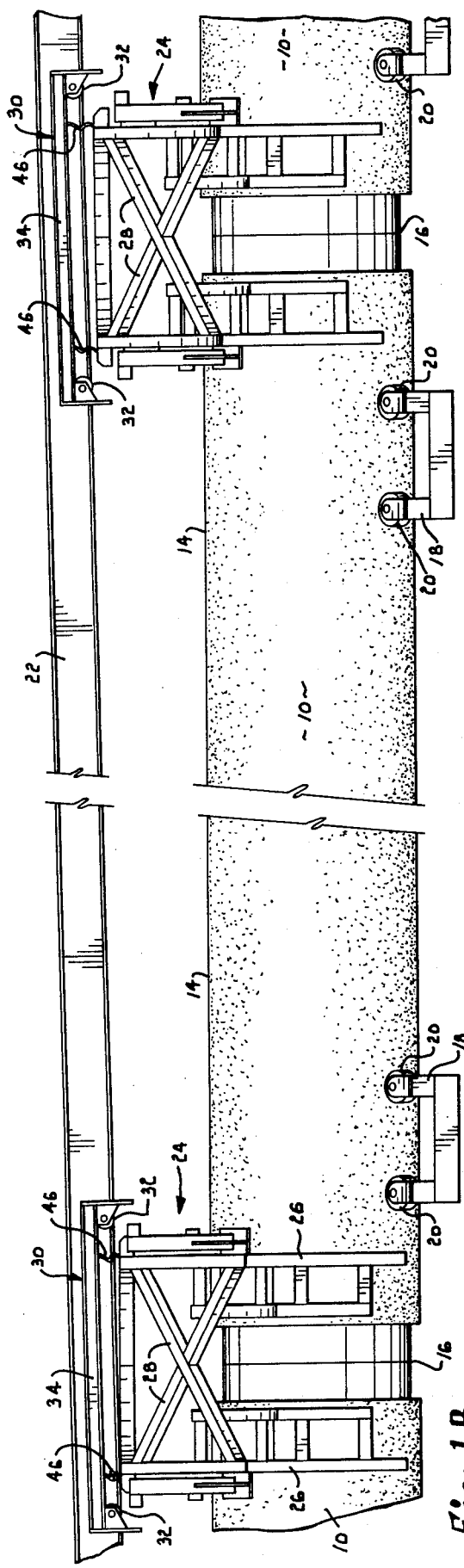
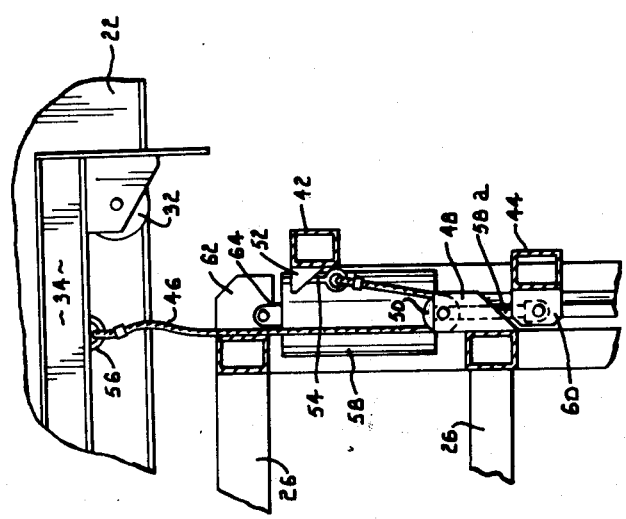

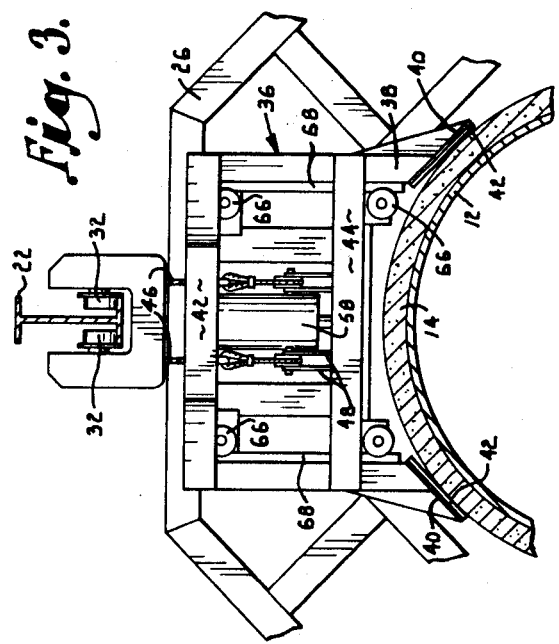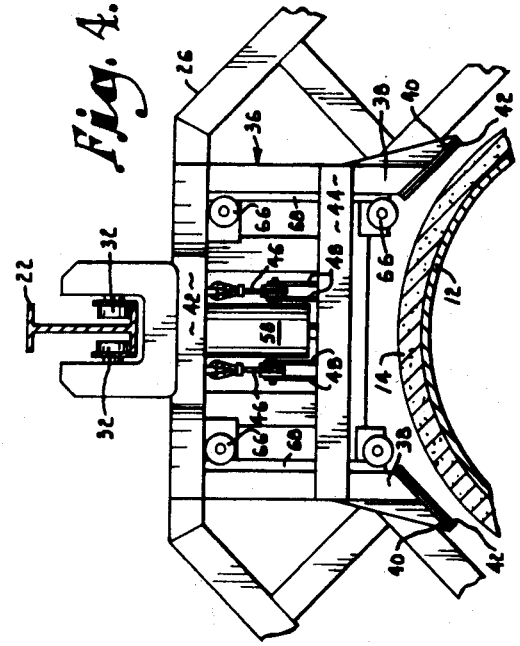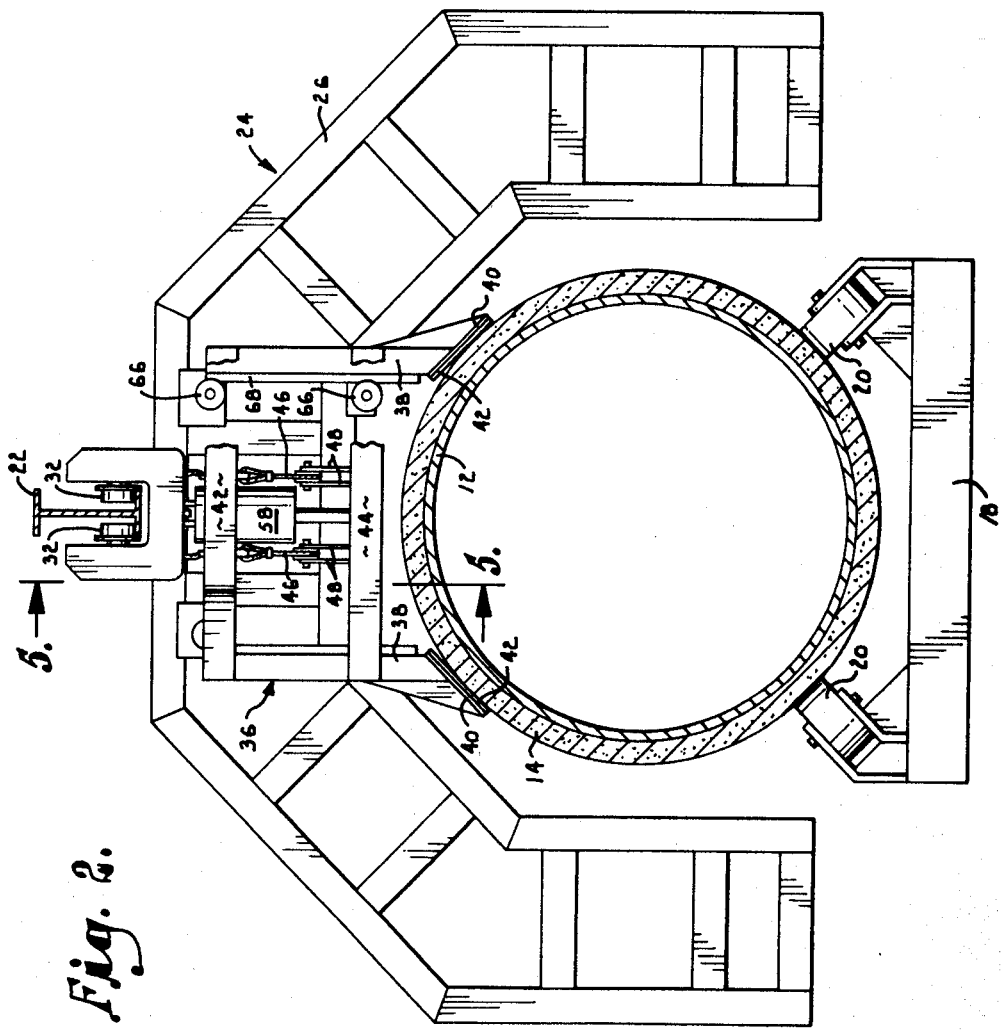

METHOD AND EQUIPMENT FOR HANDLING PIPE MOUNTED CARRIAGE

This invention relates to movable supports for mounting power equipment and, more particularly, to apparatus for supporting a carriage in working relationship to a work surface where it is necessary to raise and lower the carriage and the working height for accomplishing this movement is variable.

Pipe lines for installation over land and in the ocean are more and more frequently welded together utilizing automatic equipment. For marine installations, a large barge is utilized and the pipe is welded and fed onto the ocean floor from the deck of the barge. Under these circumstances, it is necessary to locate the welding machines at predetermined stations and to effect movement of the pipe onto the ocean floor by moving the barge forward after the pipe has been welded and is ready to lay. This movement of the barge in turn results in relative movement between the pipe and the welding equipment. In order to accommodate this movement, it is necessary to pick up the equipment for clearance of the pipe. Accordingly, the welding equipment is mounted on a carriage which is supported from an overhead beam. Power equipment is utilized to raise or lower the carriage from the stationary beam.

Because of the inherent manner of construction of modern lay barges, the overhead support beam cannot be parallel to the axis of the pipe being welded. Carriages for automatic welding machines are disposed at various locations along the length of the pipe for the purpose of completing one of numerous welding passes. Each carriage is designed to set on the pipe at a particular location so that there will be a slack in the support cable. This assures that the entire weight of the machine will be resting on the pipe during welding. Since the support beam is inclined relative to the axis of the pipe, the different carriages are actually suspended from the overhead support with more or less cable length so as to take into account the amount of inclination from one welding station to the next.

A problem is encountered, however, when the carriages are raised so as to permit movement of the barge and hence the pipe. Because each pipe section may vary somewhat in length and because of the huge size of lay barges and the often present rough sea conditions, it is not possible to bring the barge to a stop so that the pipe to be welded will be located exactly beneath the welding stations. This necessitates that the carriages for the welding machines be moved a distance of several feet so as to bring them into alignment with the pipe joints to be welded. If a carriage is moved along the inclined support beam to a location where the distance between the beam and the pipe is less than the distance at which the carriage was originally designed to operate, there will obviously be more slack cable present when the carriage is lowered onto the pipe. In some instances, the deviation in the working distance may be so great that even when the carriage legs are fully retracted the carriage is still resting on the pipe.

The present invention addresses and solves the problems outlined above by providing apparatus for raising and lowering the carriage for automatic welding equipment which allows the carriage to be supported by a cable which will go slack when the carriage is properly positioned and where a single power mover extends and retracts the supporting legs and is also capable of lifting the entire carriage to provide extra clearance which would not otherwise be possible.

It is, therefore, a primary object of the present invention to provide apparatus for supporting a tool mounting carriage relative to a work surface where the carriage is mounted from an overhead support, the carriage legs are extendable and retractable and a single power source is utilized to both move the retractable legs and lift the entire carriage assembly.

It is another object of the present invention to provide apparatus for extending and retracting the support legs of a tool mounting carriage positioned on a length of pipe which apparatus assures that the carriage will always be located in the same position relative to the surface of the pipe each time the legs are extended.

Still another object of the present invention is to provide apparatus for supporting a carriage on a work surface where the entire weight of the carriage will rest on the surface when the carriage is in its operating position thus assuring reproducibility of results and minimizing the possibility of movement of the carriage relative to the work surface.

As a corollary to the above object, an aim of the invention is to provide apparatus for supporting a carriage where an overhead cable is used and provision is made for the cable to always remain slack when the carriage is in its working position, but wherein all of the slack may be removed and the carriage itself lifted for sufficient clearance from the working position.

A principal aim of the invention is to provide apparatus as described in the foregoing objects, which will accommodate any variations in height between a work surface and an overhead beam from which a tool mounting carriage is supported.

Other objects of the invention will be made clear or become apparent from the following description and claims when read in light of the accompanying drawing wherein:

FIG. 1A is an elevational view of the apparatus of the invention utilized to support an automatic welding machine for pipe;

FIG. 1B is another elevational view similar to FIG. 1A and illustrating the same machine after it has been moved to a location where the distance between the pipe and the overhead support beam is less than in the prior position;

FIG. 2 is a vertical cross-sectional view through the pipe and illustrating the apparatus of the invention in elevation with legs extended and carriage supported on the pipe;

FIG. 3 is a fragmentary elevational view of the apparatus of the invention after the support legs have been partially retracted;

FIG. 4 is an elevational view similar to FIG. 3 illustrating how the entire carriage is lifted as the retraction of the legs is continued; and FIG. 5 is a vertical cross-sectional view taken along line 5 of FIG. 2 to illustrate the power mover and the manner of attachment to the carriage and the overhead support beam.

Referring initially to FIGS. 1A and 1B, a plurality of pipe sections, commonly referred to in the trade as pipe joints, are designated by the reference numeral 10. Each pipe joint 10 includes a cylindrical steel pipe 12 (FIG. 2) and a thick concrete coating 14. It is to be understood that various types of coatings may be utilized on the pipe and the present invention is in no way limited to pipe coated with concrete. In nearly all marine installations, however, the concrete coating is a necessity to provide negative buoyancy. Typically, the concrete coating may vary in thickness to some degree, possibly as much as one or two inches and this variation in thickness must be accommodated by the apparatus of the present invention.

Pipe joints 10 are typically provided in 40-foot sections and these sections have the coating cut away from their ends so as to expose the bare pipe 12. When two ends are joined in abutting relationship, a welding area 16 is presented.

The pipe joints 10 are supported along their length by a plurality of roller type conveyors 18. Each of the conveyor units 18 has a plurality of wheels 20 for supporting the pipe joints without damage to the coating 14.

The present invention finds particular application in deep sea lay barges where an overhead beam, such as 22, is used to support equipment for automatically welding the pipe joints together. Because of the inherent design characteristics of lay barges, beam 22 may not be parallel with the axis of pipe joint 10. The angle of inclination has been slightly exaggerated in FIGS. 1A and 1B for purposes of illustration. Typically, the distance between pipe joint 10 and beam 22 will vary three to four inches for each 10 feet of length.

A support carriage for automatic welding equipment is designated generally by the numeral 24. Carriage 24 comprises two support frameworks 26, each of which extends around approximately three-fourths of the diameter of one of the pipe joints and which frameworks are joined together by a plurality of cross braces 28.

The afore-described apparatus is conventional and well known in the art. The apparatus of the invention which accomplishes raising and lowering of the carriage so as to accommodate movement of the pipe joints 10 relative to the carriage within the limited space between support beam 22 and the pipe will now be described. A movable trolley is designated generally by the numeral 30 and is mounted on beam 22. Trolley 30 comprises two pairs of rollers 32 (FIG. 2) mounted on brackets which are in turn rigid with two header beams 34, one disposed on either side of beam 22.

A retractable leg unit is coupled with each framework 26 at opposite ends of carriage 24 and is designated generally by the numeral 36. Only one of the units 36 will be described in detail, it being understood that the other unit is identical thereto.

Each unit 36 has first and second vertically disposed legs 38 to which are secured flat feet 40. A resiliant padding 41 is placed on the bottom of each foot 40. Upper and lower horizontal cross ties, 42 and 44 respectively, are rigid with each leg 38.

Retractable leg units 36 as well as carriage 24 are coupled with trolley 30 by a pair of cables 46. The manner of attachment of each of the cables is identical and accordingly only one will be described in detail. Referring to FIG. 5, a bracket 48 is welded to a lower horizontal section of framework 26 and this bracket in turn mounts a sheave 50. Another bracket 52 extends from cross tie 42 rearwardly in the direction of carriage 24 and this bracket receives an eye bolt 54. An eye hook 56 is secured to header beam 34 and one end of cable 46 is received by this hook and secured. The cable is then trained around sheave 50 and the other end is secured through the eye of bolt 54.

As best seen from viewing FIG. 2, disposed between the two spaced-apart cables 46 is a power cylinder designated generally by the numeral 58. Cylinder 58 is coupled with both the retractable leg unit 36 and the carriage 24 in the following manner (see FIG. 5). A first set of mounting ears 60 extends rearwardly of cross tie 44 and receives the end of the cylinder piston rod 58a. A second set of mounting ears 62 projects from an upper section of framework 26 and receives mounting flanges 64 which are rigid with cylinder 58.

A plurality of V-rollers 66 (FIG. 3) are also mounted on framework 24 and receive one of two complementally-configured track sections 68 which are rigid with the inward side of each of legs 38.

In use, it is to be understood that the carriage 24 will normally support automatic equipment for welding pipe sections 10. This equipment has been omitted from the drawings for purposes of clarity and forms no part of the present invention. Carriage 24 will be positioned so that the welding equipment is in alignment with the welding area and the leg units 36 will be extended to support the carriage. It is important that the length of cables 46 be selected so that once the carriage 24 is in its working position with leg units 36 extended, there will be some slack in the cable. A slack of approximately two inches is normally used. The slack in the cable assures that the carriage will always be placed in the same position relative to the surface of the pipe since the entire weight of the carriage is supported on the pipe and the leg units are always fully extended. This helps to assure repeatability in the operation of the welding machines. Another reason for providing the cable slack is so that no weight will be carried by the overhead beam which would in turn lessen the load on the pipe. If the entire weight was not supported by the pipe, the chances of movement of the carriage relative to the pipe would be increased. Finally, as noted above, there are inherent variations in the coating thickness itself. Thus, it is desirable to have some excess slack so that even if the coating thickness is less than normal and the carriage in turn sits lower relative to the overhead beam, there will still be some slack in cables 46.

With the foregoing objectives in mind, actual operation of the apparatus will now be described. Power cylinders 58 are actuated and the piston rod 58a is moved downwardly to extend leg units 36 their full distance as they travel over a rectilinear path defined by tracks 68 and rollers 66. It is noted that leg units 36 will always be moved their full extended distance represented by the one-way length of the path over which they are designed to travel. Before feet 40 contact the pipe, cables 46 are taut as the weight of the entire assembly is carried by the cables. Feet 40 will come into contact with the pipe before the legs reach the farthest limits of their path of travel. At this point in time, the weight of the carriage 24 is transferred from the cables to the leg units 36. As cylinder 58 continues to extend and the legs continue to move relative to carriage 24, slack in cables 46 results.

Preferably, the effective power stroke of cylinder 58 is such that a minimum of two inches of slack in cables 46 will occur upon full extension of the cylinders even when the distance between the pipe and beam 22 is at the design maximum.

When it is desired to move pipe 10 relative to carriage 24 either because of an interruption in the work or because of normal advancement of the barge during the laying operation, cylinder 58 is actuated to move piston rod 58a upwardly and retract leg units 36. As this occurs, the weight of carriage 24 as well as the weight of the leg units will again be shifted to cables 46 as the legs retract and the cables become taut. As long as the carriage remains in the position along beam 22 shown in FIG. 1A, there will be adequate clearance between pipe 10 and the carriage even though a portion of the power stroke of cylinder 58 is utilized to remove the slack in cables 46.

It is also to be noted that the effective distance legs 36 are moved is greater than the power stroke of the cylinder (less whatever slack is in the cable) by virtue of the pulley arrangement 50. Sheave 50 is located below the point of attachment of cable 46 to leg units 36 so that the entire weight of the assembly will be carried by the cables whenever they are taut and raising of the legs 36 will also raise the carriage 24 whenever the cables are taut. That is, for every one inch piston rod 58a retracts, the end of cable 46 secured to cross tie 42 will also be raised one inch resulting in raising of the overall assembly by one-half this amount. This allows for a cylinder having a shorter stroke to be employed in the confined area and yet increases the effective distance the cylinder moves the assembly. For example, (ignoring cable slack) if cylinder 58 has a six inch power stroke, legs 36 will move this distance relative to carriage 24 during full retraction. Simultaneously, the carriage and leg assembly is moving upward by another three inches for an overall gain in height between the feet 40 and the pipe surface of nine inches. If there is two inches of slack cable, the actual clearance will be seven inches.

After the legs have been retracted and the barge moved forward, it is unlikely that upon cessation of movement the next welding area 16 will be in alignment with the welding machines mounted on the carriage. For example, the welding area may now be located in the position shown in FIG. 1B which is "downhill" along beam 22 from the position shown in FIG. 1A. This necessitates that carriage 24 be moved along beam 22 until it is in alignment with the next area to be welded. Since beam 22 is closer to the pipe at this point, the distance between the two will be less than the distance available when the carriage was located in the position shown in FIG. 1A. Leg units 36 are again extended as shown in FIG. 2 although this time the feet 40 will contact the pipe earlier in the power stroke than in FIG. 1A. The cylinder will continue to move through its full power stroke until the legs are fully extended so that carriage 24 will be properly positioned relative to the surface of pipe 12. This, of course, results in considerable more slack in cables 46 than the minimum slack which was present when the carriage was in the position shown in FIG. 1A.

In some situations, the amount of slack in cable 46 may be so great that a great amount of the power stroke of cylinder 58 is utilized simply to remove this slack. Thus, as illustrated in FIG. 3, under these extreme conditions, the entire assembly may be still resting on the pipe surface after the cylinder is two-thirds to three-fourths retracted. If cylinder 58 has a maximum power stroke of six inches and if it was coupled with legs 36 without the benefit of the cable and pulley arrangement heretofore described, the six inch raising of the legs would not always be enough to provide adequate clearance with the pipe where, for example, four to six inches of slack is present in the support cable.

With the pulley and cable arrangement of the present invention, the effective height to which legs 36 may be raised is greater than it otherwise would be. Thus, even in the extreme situation depicted in FIG. 3, where there is substantial slack cable, as cylinder 58 continues to retract and raise legs 36 it will also raise the entire assembly to provide adequate clearance as shown in FIG. 4.

From the foregoing it is seen that the invention meets all of the objectives heretofore set forth and provides a substantial advancement in the art of carriages for mounting equipment relative to a working surface.

We claim:

1. Apparatus for supporting a carriage in working relationship to a work surface, said apparatus being coupled with an overhead support and comprising:
   an extendable support leg movable relative to said carriage over a rectilinear path between extended and retracted positions;
   cable means coupling said leg and said carriage with said overhead support;
   means for moving said leg between extended and retracted positions, said moving means being coupled with said leg and with said carriage, the cable being of sufficient length relative to the distance between said extended and retracted positions of the leg, whereby the cable is slack and the entire weight of the carriage is supported by the leg on the work surface when the leg is in its extended position and the cable is taut and the leg is clear of said surface when the leg is in its retracted position.

2. Apparatus as set forth in claim 1, wherein is included sheave means coupled with said carriage for receiving said cable means and means for securing said cable means to said support leg, said sheave means being positioned below said cable receiving means whereby when said cable is taut said carriage is supported by said leg.

3. Apparatus as set forth in claim 2, wherein said means for moving said legs comprises power cylinder means having one end coupled with said carriage and one end coupled with said leg.

4. Apparatus as set forth in claim 1, wherein when said moving means is fully extended said carriage is supported by said support leg.

5. Apparatus for supporting a welding machine carriage in working relationship to a pipe to be welded, said apparatus being coupled with an overhead support and comprising:
   first and second extendable support legs, each of said legs having two pipe engaging feet and being movable relative to said carriage over a rectilinear path between extended and retracted positions;
   track means for mounting said support legs for reciprocal movement relative to said carriage;
   first and second cable means coupled with said overhead support and with said first and second support legs, respectively;
   first and second sheave means disposed on said carriage for receiving said first and second cable means, said first and second sheave means being disposed below the point of attachment of said cable means to said support legs; and
   first and second power cylinder means coupled with said carriage and with said first and second support legs, respectively, said first and second cable means respectively including cables of sufficient lengths relative to the distance between said extended and retracted positions of the corresponding support legs whereby the cables are slack and the entire weight of the carriage is supported on the pipe by the legs when the latter are in their extended positions and the entire weight of the carriage is supported by the cables with the legs clear of the pipe when the legs are in their retracted positions, and whereby retraction of said legs results in simultaneous upward movement of said carriage.

6. Apparatus for raising and lowering a welding machine carriage through a variable working distance between a pipe to be welded and an overhead support, said apparatus comprising:

extendable leg means;

means mounting the leg means on the carriage for up and down movement relative to the carriage along a path of travel for engagement of the leg means against the surface of the pipe;

power cylinder means operably coupled with the carriage and the leg means for moving the latter along said path, said power cylinder means having a predetermined stroke; and cable means operably coupled with the leg means and adapted to be coupled with said overhead support, the cable being of sufficient length relative to the stroke of the power cylinder means and the variable working distance whereby the cable is slack and the entire weight of the carriage is supported by the leg means engaging the pipe at one end of the stroke of the power cylinder means and the leg means is retracted from the pipe and the entire weight of the carriage is supported by the cable at the opposite end of said stroke.

* * * * *